Patented Apr. 12, 1949

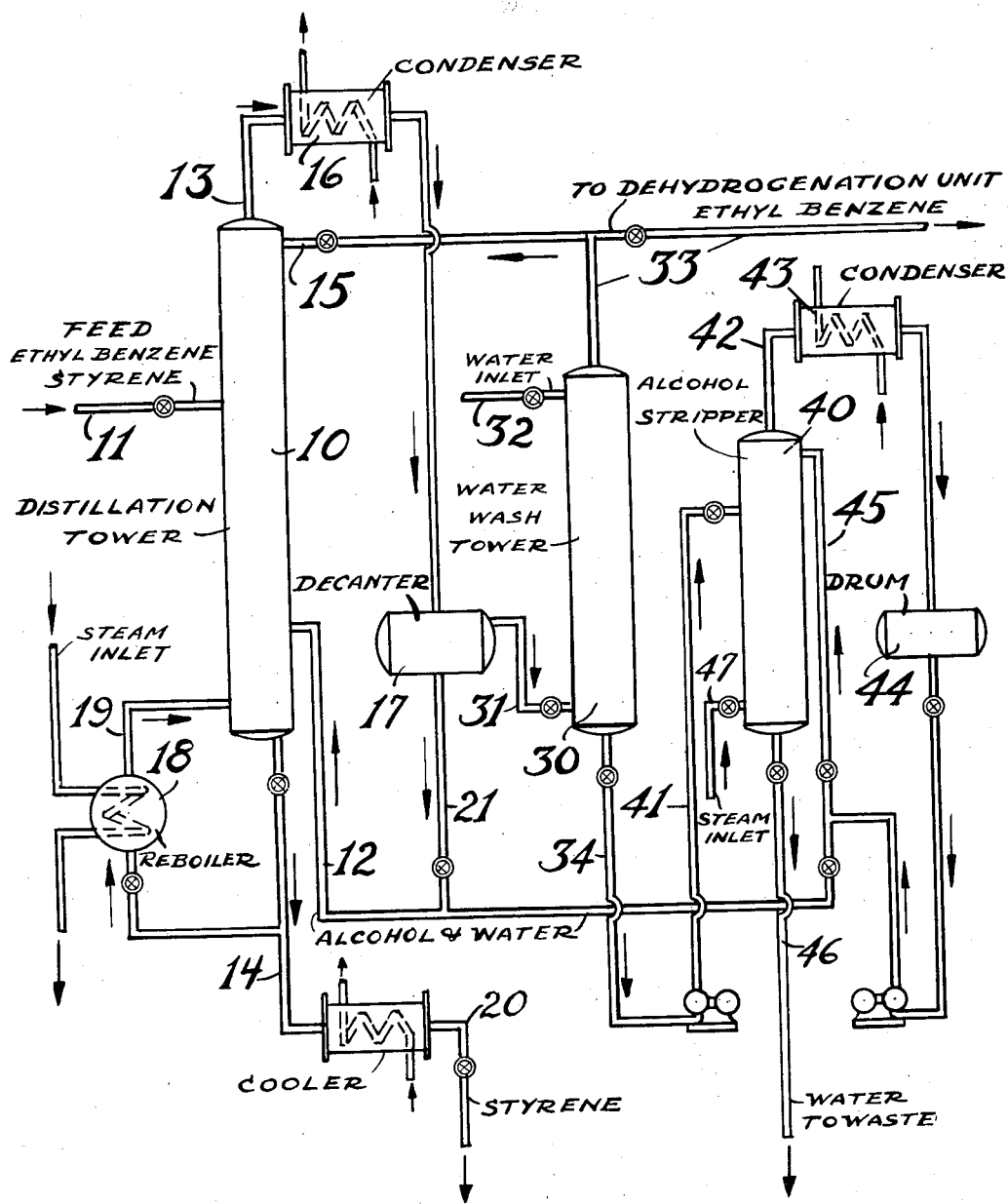

2,467,152

UNITED STATES PATENT OFFICE 2,467,152

DISTILLATION OF ETHYL BENZENE FROM STYRENE

Ernest O. Ohsol, Cranford, and John A. Patterson, Westfield, N. J., assignors to Standard Oil Development Company, a corporation of Delaware Application November 23, 1944, Serial No. 564,808

9 Claims. (Cl. 202—42)

This invention relates to the separation of ethyl benzene from styrene by distillation, and in particular to the separation of styrene derived from the dehydrogenation of ethyl benzene.

Today, styrene is an important basic material for the preparation of a variety of plastics. In fact, the annual production capacity is about 300,000 tons. The main source of styrene is through the dehydrogenation of ethyl benzene. Separation of styrene from unreacted ethyl benzene can be made by distillation but it is usually a relatively expensive and difficult operation because the boiling points of the two substances are relatively close and prolonged heating of the less volatile styrene is necessary to effect such separation. Thus, in the separation by distillation of ethyl benzene from styrene a large number of theoretical steps and a high reflux ratio are required, which involves a long residence time in the distillation system. As styrene polymerizes at an appreciable rate at elevated temperatures, a minimum time of residence is desirable in a distillation system to minimize the amount of styrene polymer formed. The present invention is concerned with an improved distillation system for separating ethyl benzene from styrene.

It has been found that by adding an azeotrope-forming compound into the distillation system for separating ethyl benzene from styrene, relatively easy separation can be effected of the ethyl benzene as a distillate material. The commercial disadvantage, however, of such separation is that the known azeotropes which are formed contain only a small percentage of ethyl benzene and a large proportion of the azeotrope-forming compound: no suitable azeotropic mixtures have been found to occur with styrene as a constituent and thus afford separation as a distillate of styrene. Thus, in the case of the oxygenated hydrocarbons, the azeotropes formed with ethyl benzene contain as high a percentage as 90% of the azeotrope-forming compound. With n-propyl alcohol, for example, in a conventional azeotropic distillation, it would be necessary to distill as an overhead fraction about 94% alcohol and 6% ethyl benzene. Furthermore, in order to make such a separation the reflux ratio required is greater than 5:1 and thus, if a saving in plates in the tower is to be made, such can only be achieved at a prohibitive increase in reflux ratio.

It has now been found that the azeotrope-forming capacity of polar derivatives of the lower hydrocarbons, and particularly the polar oxygenated derivatives of the hydrocarbons containing up to 6 carbon atoms in the molecule, may be utilized to commercial advantage if the addition is made to the distillation system in amounts insufficient to form an azeotrope with all of the ethyl benzene present but sufficient to aid in the complete separation of the ethyl benzene from the styrene in the stripping section of the tower. Liquids particularly suitable for this purpose are n-propyl alcohol, isobutyl alcohol, ethyl carbonate, ethylene bromide, propionic acid and methyl propyl ketone. By such processing, therefore, the azeotrope-forming compound is present in just sufficient amount to form with all the ethyl benzene in the stripping section an azeotrope and to pass upwards through the tower with the further quantities of ethyl benzene separated from the feed supply above the stripping section.

This use of the azeotrope-forming compound is the means of effecting the purification of the styrene in the stripping section and obviates the commercial disadvantage of the added cost involved if an azeotrope is formed only with the relatively small quantities of ethyl benzene in the stripping section of the distillation system. Thus, in the section of the column where the last 5% of ethyl benzene is removed a large number of plates are normally required in a non-azeotropic distillation to effect the separation, but by adding an amount of propyl alcohol in a quantity sufficient to form the binary azeotrope with the ethyl benzene present in this section of the fractionating column the number of theoretical plates required to effect the separation may be cut to at least half and the reflux based on hydrocarbon decreases so that little or no increase in total reflux is necessary. Also, above the feed supply the added component will act similar to the hydrocarbon reflux so that no increase in reflux ratio will be necessary on the basis of the overhead flow.

The particular advantage of the invention may be further enhanced by the use of a fourth component in the distillation system to reduce the temperature at which the separation is effected between the ethyl benzene and the styrene. This fourth component is usually, and most advantageously, water. Thus, water added to the system below the feed supply together with the oxygenated hydrocarbon employed as the azeotrope-forming compound lowers the boiling point still further of the binary mixture of the ethyl benzene and oxygenated hydrocarbon due to the formation of a ternary azeotrope. In this manner, the ease of separation of the ethyl benzene from the styrene is improved. Furthermore, the additional component displaces the composition of the azeotropic mixture considerably toward the hydrocarbon, thus decreasing the amount of material necessary to add, or increasing the composition range in the fractionating tower over which the azeotrope-forming constituents are efficacious. In this manner, the number of theoretical plates necessary for the separation is reduced. Also, the further advantage is obtained when distilling with a ternary water-containing azeotrope, of the convenience of separating the oxygenated hydrocarbons, particularly when alcohol is used, by means of water-washing the overhead product.

In order that the invention may be more fully understood, the following illustration of processing is presented when read in conjunction with the accompanying drawing. Equipment 10 is any form of suitable fractionating equipment such as a bubble plate tower containing 60 plates or a packed tower. About the center of the tower the feed is supplied through line 11. For the particular purpose of illustration, the feed has the following composition:

| | Per cent |
|---|---|
| Styrene | 60 |
| Ethyl benzene | 40 |

Below the feed line, through line 12, n-propyl alcohol containing about 18% water is supplied. The tower 10 is equipped with an overhead vapor line 13, bottoms line 14 and a reflux line 15. The overhead vapor line is connected to a condenser 16 which in turn is connected to a decanter 17. The bottoms line 14 is connected to a reboiler 18 and a return vapor line 19 from the reboiler. The cooled styrene is removed through line 20.

In the operation of tower 10 at essentially atmospheric pressure, the heat required for the processing is initially supplied by means of the vapor return line 19 after passing through reboiler 18. By the addition of about 20%, based upon the feed supply, of the n-propyl alcohol containing about 18% water, separation is effected of the small amounts of ethyl benzene contained in the styrene in the stripping section of the tower. The temperature at this point in the tower is about 285° F. Above the feed supply line 11, the ternary azeotrope consisting of 55.1% of n-propyl alcohol, 12.5% water and 32.4% ethyl benzene, becomes associated with the ethyl benzene separated from the feed on the plate upon which the feed supply is furnished. Above the level of the supply line 11, the ternary azeotrope and ethyl benzene pass upwards and pass overhead through line 13 to the condenser 16 and then as condensate pass into the decanter 17. The upper layer in the decanter 17 is passed through line 31 to the tower 30. The lower layer is removed from the decanter through line 21 to junction with the alcohol-water supply line 12 to the tower 10.

In the tower 30 the upper layer from the decanter is countercurrently treated with water admitted through line 32. Passing out from the top of the tower through line 33 is ethyl benzene saturated with water. A portion of this stream is passed through line 15 as reflux to the tower 10 and the remainder returned to the dehydrogenating unit for further processing to produce added quantities of styrene. From the bottom of the tower 30 the aqueous alcohol solution is removed through line 34 and passed to the distillation tower 40 through line 41.

The tower 40 is any form of conventional distillation equipment but preferably is a bubble tower containing about 30 plates equipped with an overhead vapor line 42, condenser 43, drum 44, reflux line 45, bottoms withdrawal line 46 and open steam line 47. In the tower 40 a relatively concentrated alcohol is removed from the bulk of the water by the heat supplied through the base as steam through line 47. The alcohol containing overhead passes through line 42 to condenser 43 and drum 44 and then to T-connection upon line 12 for recycling of the alcohol-water mixture to the tower 10 for the further separation of additional quantities of ethyl benzene from styrene.

What is claimed is:

1. A process for the separation of ethyl benzene from styrene which comprises feeding a mixture of ethyl benzene and styrene to a distillation zone, separating the bulk of the ethyl benzene from the styrene by fractional distillation in said distillation zone whereby the bulk of the ethyl benzene is vaporized and removed overhead from the distillation zone, passing the styrene containing traces of ethyl benzene downwardly into a stripping zone, introducing into the lower portion of the stripping zone a liquid which preferentially forms an azeotrope with said traces of ethyl benzene in an amount sufficient only to form an azeotrope with said traces, removing the traces of ethyl benzene in the form of an azeotrope overhead from the styrene in the stripping zone and recovering substantially pure styrene from the bottom of said stripping zone.

2. Process according to claim 1 in which the liquid which forms preferentially an azeotrope with the ethyl benzene is a polar derivative of a lower hydrocarbon.

3. Process according to claim 1 in which the liquid is an oxygenated polar derivative of a hydrocarbon containing up to six carbon atoms in the molecule.

4. Process according to claim 1 in which the liquid is an aqueous mixture of a polar derivative of a lower hydrocarbon.

5. Process according to claim 1 in which the liquid comprises n-propyl alcohol.

6. Process according to claim 1 in which the liquid comprises isobutyl alcohol.

7. Process according to claim 1 in which the liquid comprises ethylene bromide.

8. A process for the separation of ethyl benzene from styrene which comprises feeding a mixture of ethyl benzene and styrene to a distillation zone, vaporizing and separating the bulk of the ethyl benzene from the styrene by fractional distillation in said distillation zone, passing the styrene containing traces of ethyl benzene from a bottom part of said distillation zone downwardly into a stripping zone, introducing into the lower portion of the stripping zone a liquid which forms an azeotrope with said traces of ethyl benzene in an amount sufficient only to form an azeotrope with said traces, passing vapors of said azeotrope through the distillation zone and recovering substantially pure styrene from a bottom part of said stripping zone.

9. A process for the separation of ethyl benzene from styrene which comprises feeding a mixture of ethyl benzene and styrene to a distillation zone, vaporizing and separating the bulk of the ethyl benzene from the styrene by fractional distillation in said distillation zone, passing the styrene containing traces of ethyl benzene from a bottom part of said distillation zone downwardly into a stripping zone, introducing into the lower portion of the stripping zone a liquid which forms an azetrope with said traces of ethyl benzene in an amount sufficient only to form an azeotrope with said traces, passing vapors of said azeotrope through the distillation zone, recovering and condensing vapors of ethyl benzene and vapors of said azeotrope, separating the condensate of ethyl benzene and said azeotrope into two layers, an upper layer consisting substantially of ethyl benzene and a lower layer consisting substantially of the azeotrope-forming liquid, returning the upper layer to the top of the distillation zone, returning the lower layer to the stripping zone, and recovering substantially pure styrene from a bottom part of said stripping zone.

ERNEST O. OHSOL.
JOHN A. PATTERSON.

REFERENCES CITED

The following references are of record in the file of this patent:

UNITED STATES PATENTS

| Number | Name | Date |
| --- | --- | --- |
| 2,028,801 | Othmer | Jan. 28, 1936 |
| 2,308,229 | Natta | Jan. 12, 1943 |
| 2,356,240 | Hamlin | Aug. 22, 1944 |
| 2,360,655 | Deanesly | Oct. 17, 1944 |
| 2,380,019 | Bloomer | July 10, 1945 |
| 2,381,996 | Bloomer | Aug. 14, 1945 |

OTHER REFERENCES

Journal of Research of the National Bureau of Standards, vol. 27, No. 1, pages 44 to 63, pages 44 to 46 relied upon July 1941, a copy of which is in Div. 25.